United States Patent [19]

Kobayashi et al.

[11] Patent Number: 4,903,811
[45] Date of Patent: Feb. 27, 1990

[54] TRANSFER DEVICE FOR A FOUR-WHEEL DRIVE MOTOR VEHICLE

[75] Inventors: Toshio Kobayashi; Katsuhisa Ozawa, both of Tokyo, Japan

[73] Assignee: Fuji Jukogyo Kabushiki Kaisha, Tokyo, Japan

[21] Appl. No.: 303,694

[22] Filed: Jan. 26, 1989

[30] Foreign Application Priority Data

Feb. 16, 1988 [JP] Japan .................. 63-033199

[51] Int. Cl.$^4$ ............................................. F16D 43/28
[52] U.S. Cl. ............................ 192/106 F; 192/85 AA; 180/235
[58] Field of Search ....... 192/106 F, 85 AA, 103 FA; 180/233, 247

[56] References Cited

U.S. PATENT DOCUMENTS

| 2,642,844 | 6/1953 | Funn | 192/85 AA |
|---|---|---|---|
| 4,147,245 | 4/1979 | Folomin et al. | 192/106 F |
| 4,421,218 | 12/1983 | Haight | 192/106 F |

FOREIGN PATENT DOCUMENTS 56-43035 4/1981 Japan .
62-52249 3/1987 Japan .

Primary Examiner—Rodney H. Bonck
Assistant Examiner—Andrea Pitts
Attorney, Agent, or Firm—Martin A. Farber

[57] ABSTRACT

A transfer device is provided for distributing the output of a transmission to front wheels and rear-wheels through a front power train and a rear power train. The output shaft of the transmission is operatively connected to the rear power train. The transfer device has a drive gear rotatably mounted on the output shaft of the transmission and engaged with a driven gear in the front power train, a fluid operated multiple-disk friction clutch having a drive drum and a driven drum. The driven drum is secured to the drive gear and the drive drum is secured to the output shaft. A piston is slidably mounted in a piston chamber and operated by oil supplied to the piston chamber for engaging the drive drum with the driven drum. A centifugal force oil chamber is formed in the fluid operated clutch opposite to the piston chamber, interposing the piston. The oil chamber is supplied with oil through an oil supply passage. A connecting passage is provided for connecting the centrifugal force oil chamber with the oil supply passage, and a check valve is provided in the connecting passage so as to maintain oil in the centrifugal force oil chamber. Thus, centrifugal force of the oil in the oil chamber acts on the piston to release the clutch.

3 Claims, 4 Drawing Sheets

TRANSFER DEVICE FOR A FOUR-WHEEL DRIVE MOTOR VEHICLE

BACKGROUND OF THE INVENTION

The present invention relates to a transfer device for a four-wheel drive motor vehicle, and more particularly to a device having a fluid operated multiple-disk friction clutch.

A four-wheel drive motor vehicle of the type in which a transfer device is provided for distributing the output torque of a transmission is disclosed in Japanese Patent Application Laid-Open 56-43035 filed by the assignee of this application. In the vehicle, the fluid operated clutch of the transfer device is provided between a drive element and a driven element of a power transmission system. The clutch comprises a drive drum and a driven drum, each having multiple-disks, and a piston oil chamber formed between drive drum and a piston. When oil is supplied to the piston chamber, the piston is urged by pressure of the oil to push disks of the drive drum against the disks of the driven drum. Thus, the opposite disks are engaged to transmit the torque of the drive element to the driven element. When the oil is drained from the chamber, the piston is returned to the initial position by a spring, so that the disks are disengaged with each other.

Since, the oil chamber is formed on a rotating shaft, when the shaft rotates at a high speed, the centrifugal force in the oil in the piston oil chamber is exerted on the piston, which causes various inconveniences.

More particularly, when the oil is drained from the piston chamber in order to disengage the clutch, the centrifugal force is still exerted on the piston, so that the clutch cannot be quickly disengaged. In addition, continuous partial engagement causes breakdown of the clutch by burning. Since the clutch is not perfectly disengaged, the four-wheel driving condition is kept. Accordingly, when the motor vehicle negotiates a corner, tight corner braking effect dependent on the difference between front-wheel speed and rear-wheel speed occurs to reduce the speed of the vehicle or to stop the vehicle.

In the vehicle having a control system for producing a desired torque distribution ratio signal for providing a desired torque distribution ratio for front and rear wheels, actual distribution ratio becomes different from the desired distribution ratio owing to the partial engagement of the clutch.

Japanese Patent Application Laid-Open 62-52249 discloses a clutch in which a centrifugal force oil chamber is provided opposite to the oil chamber interposing the piston. The lubricating oil is supplied to the centrifugal force oil chamber to generate the centrifugal force for canceling the centrifugal force of oil in the piston oil chamber. Accordingly, since the lubricating oil is continuously supplied from the oil pump to the centrifugal force oil chamber, the centrifugal forces in both chambers are balanced. However, the centrifugal forces vanish when the engine stops. Consequently, if the motor vehicle is towed by a wrecker to a garage, the centrifugal force of the oil occurs only in the oil chamber by the rotation of the clutch during the towing of the vehicle, because the oil in the centrifugal force oil chamber is drained and the oil is remained in the oil chamber. Thus, the clutch brakes down during the towing due to the engagement of the clutch. On the other hand, at the starting of the engine, it takes some time to charge the centrifugal force oil chamber with oil, so that the operation of clutch during the some time becomes unstable.

SUMMARY OF THE INVENTION

An object of the present invention is to provide a transfer device in which centrifugal force exerted on a piston in a clutch in the transfer device is canceled at any operating conditions of the engine.

According to the present invention, there is provided a transfer device for a four-wheel drive motor vehicle for transmitting output of a transmission and for distributing the output to front wheels and rear wheels through front power train and a rear power train, comprising a fluid operated clutch having a drive drum and a driven drum which are engaged with each other by pressure of oil, the drive drum being secured to the output shaft of the transmission and to one of the front and rear power trains and the driven drum being secured to the other power train, and a piston slidably mounted in a piston chamber and operated by oil supplied to the piston chamber for engaging the drive drum with the driven rum, a centrifugal force oil chamber formed in the fluid operated clutch opposite to the piston chamber, interposing the piston, an oil supply passage for supplying oil in the piston chamber, for operating the piston, a spring provided in the centrifugal force oil chamber for urging the piston in a releasing direction, a connecting passage connecting the centrifugal force oil chamber with the oil supply passage, a check valve provided in the connecting passage so as to maintain oil in the centrifugal force oil chamber, whereby centrifugal force of the oil in the oil chamber acts on the piston to release the clutch.

In an aspect of the invention, the transmission is an automatic transmission, and the fluid operated clutch is a fluid operated multiple-disk friction clutch.

The other objects and features of this invention will become understood from the following description with reference to the accompanying drawings.

DETAILED DESCRIPTION OF THE PREFERRED EMBODIMENT

Figure 1A:
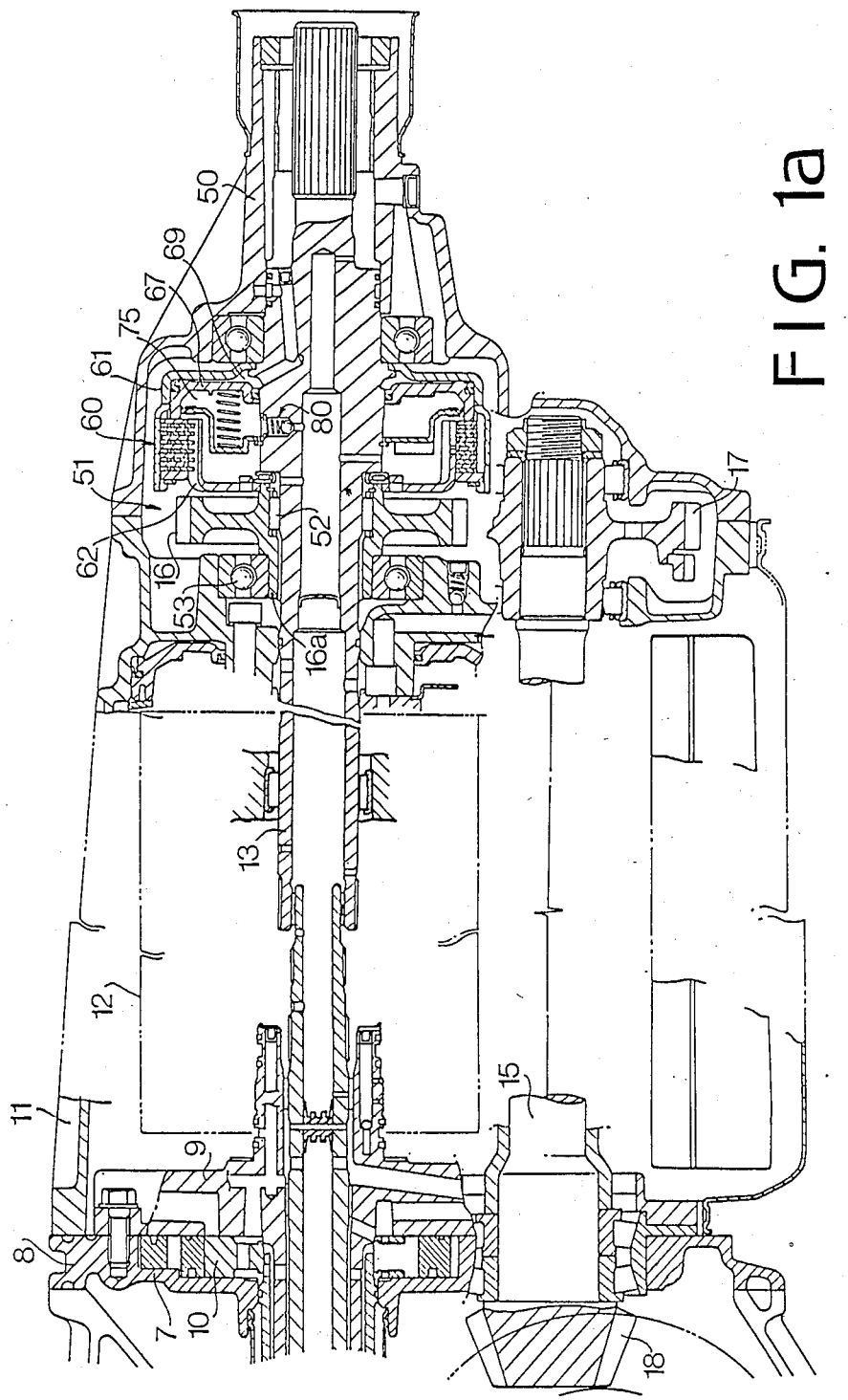
FIGS. 1a and 1b are sectional views showing a power transmission system for a four-wheel drive motor vehicle having a transfer device according to the present invention.
Figure 1B:
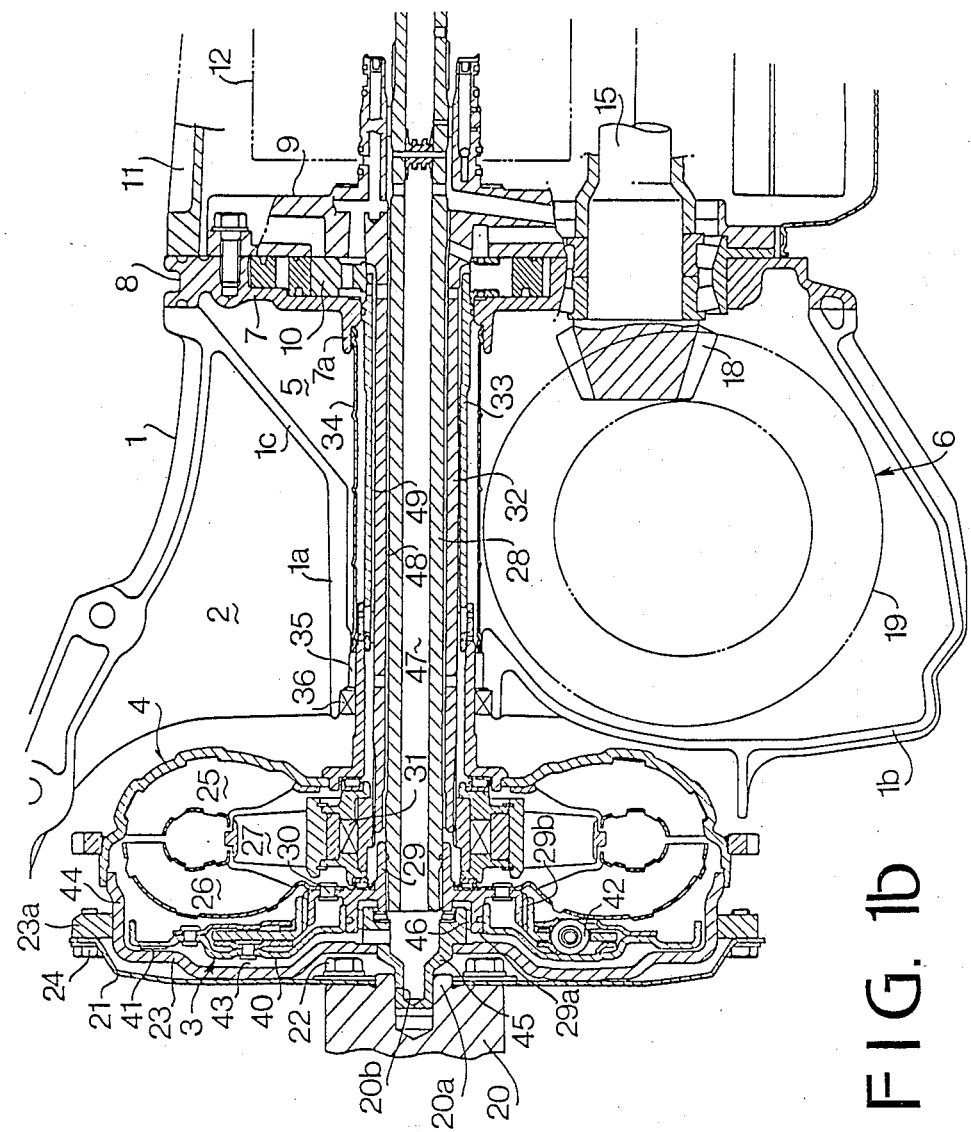

FIGS. 1a and 1b show a power transmission system in a transaxle type for a rear-wheel drive based four-wheel dive motor vehicle having an engine at a front portion thereof. The power transmission system has a differential case 1 made of die casting aluminum, a torque converter 4 with a lockup clutch 3 mounted in a converter box 2, and a differential 6 mounted in a differential box 5 behind the torque converter 4. The differential case 1 has a cylindrical portion 1a, and a lower partition 1b and an inclined partition 1c which define a front side compartment and a rear side compartment. To the rear end of the differential case 1, a shaft supporting plate 8 having a pump housing 7 is attached. An oil pump 10 is housed in the pump housing 7 and a cover 9. A transmission case 11 housing an automatic transmission 12 is attached to the rear of the shaft supporting plate 8.

A crankshaft 20 of the engine has a boss 20a to which a drive plate 21 is fixed by bolts 22. A converter cover 23 is secured to the drive plate 21 by bolts 24 at a flange 23a. The torque converter 4 comprises an impeller 25 integral with the converter cover 23 by welding, a turbine 26 and a stator 27 connected to a hollow stator shaft 32 through a one-way clutch 31. The turbine 26 is fixed by rivets 30 to a disc having a turbine hub 29 which is splined to an input shaft 28 disposed in the stator shaft 32.

The input shaft 28 extends into the transmission case 11. The stator shaft 32 is integral with the cover 9 of the oil pump 10. A pump drive shaft 33 surrounding the stator shaft 32 is connected to the impeller 25 and is operatively connected with a rotor of the oil pump 10. In order to prevent leakage of automatic transmission fluid and mixing of the fluid with oil for differential gears, a seal pipe 34 for covering the pump drive shaft 33 is further provided. The front end portion of the seal pipe 34 is tightly embedded in the cylindrical portion 1a of the differential case 1 through a bush 35 and sealed by an oil seal 36 to prevent the oil from leaking. The rear end is tightly embedded in a boss 7a of the pump housing 7. The seal pipe 34 collects the oil leaked from the pump drive shaft 33 and from the oil pump 10 to separate the oil for the differential gears from the oil for the automatic transmission.

The lockup clutch 3 of the torque converter 4 has a lockup piston 40 disposed adjacent the converter cover 23. Near the periphery of the lockup piston 40, a facing 41 is attached adjacent the cover 23 for making a contact with the cover 23. A torsion damper 42 is attached to the lockup piston 40 adjacent the turbine 26. A release side oil chamber 43 for applying release pressure to the lockup piston 40 is defined in a front portion of the lockup piston 40. Behind the lockup piston 40, an apply side oil chamber 44 connected to the torque converter 4 is formed for applying lockup pressure to the lockup piston 40.

A hollow pilot boss 45 is engaged with the converter cover 23 and is secured thereto. The pilot boss 45 projects out of the converter cover 23 and is engaged with hole 20b formed in the center of the crankshaft 20.

The turbine boss 29 has an annular inner boss 29a and an annular outer boss 29b. The pilot boss 45 is mounted in the inner boss 29a, interposing a bush 46 so that the turbine 26 is rotatably supported on the pilot boss 45. Slidably mounted on the inner boss 29a is the lockup piston 40. A hub of the torsion damper 42 engages with the outer boss 29b through splines.

The oil in the turbine 26 of the torque converter 4 is further supplied to the apply side chamber 44 to urge the lockup piston 40 toward the converter cover 23. The pressure of oil in the release side chamber 43 is set to a value slightly higher than that of the apply side chamber 44 to disengage the lockup piston 40 from converter cover 23.

A hydraulic circuit for the torque converter 4 comprises an oil passage 47 formed in the input shaft 28 for the release of the lockup clutch 3. The passage 47 is communicated with the release side oil chamber 43 through the hollow of the pilot boss 45. An oil passage 48 formed between the input shaft 28 and the stator shaft 32 is communicated with the turbine 26 and the apply side oil chamber 44. A drain passage 49 for draining the oil in the impeller 25 is formed between the stator shaft 32 and the pump drive shaft 33.

The automatic transmission 12 has a well known structure and operates to transmit the power of the engine to an output shaft 13 which is disposed at the rear end of the input shaft 28.

A front drive shaft 15 is provided in parallel with the input shaft 28 and the output shaft 13. A reduction gear 16 mounted on the output shaft 13 engages with a reduction gear 17 mounted on the front drive shaft 15. Thus, the power of the engine transmitted to the rear side of the transmission is transmitted to the front side thereof. An end drive pinion 18 of the front drive shaft 15 engages with a crown gear 19 of the differential 6 to transmit the power of the engine to the front drive wheels.

An extension case 50 is connected to the rear end of the transmission case 11. The output shaft 13 is further mounted in the extension case 50, and operatively connected to rear wheels to transmit the power of the engine to the rear drive wheels through a propeller shaft (not shown).

Figure 2:
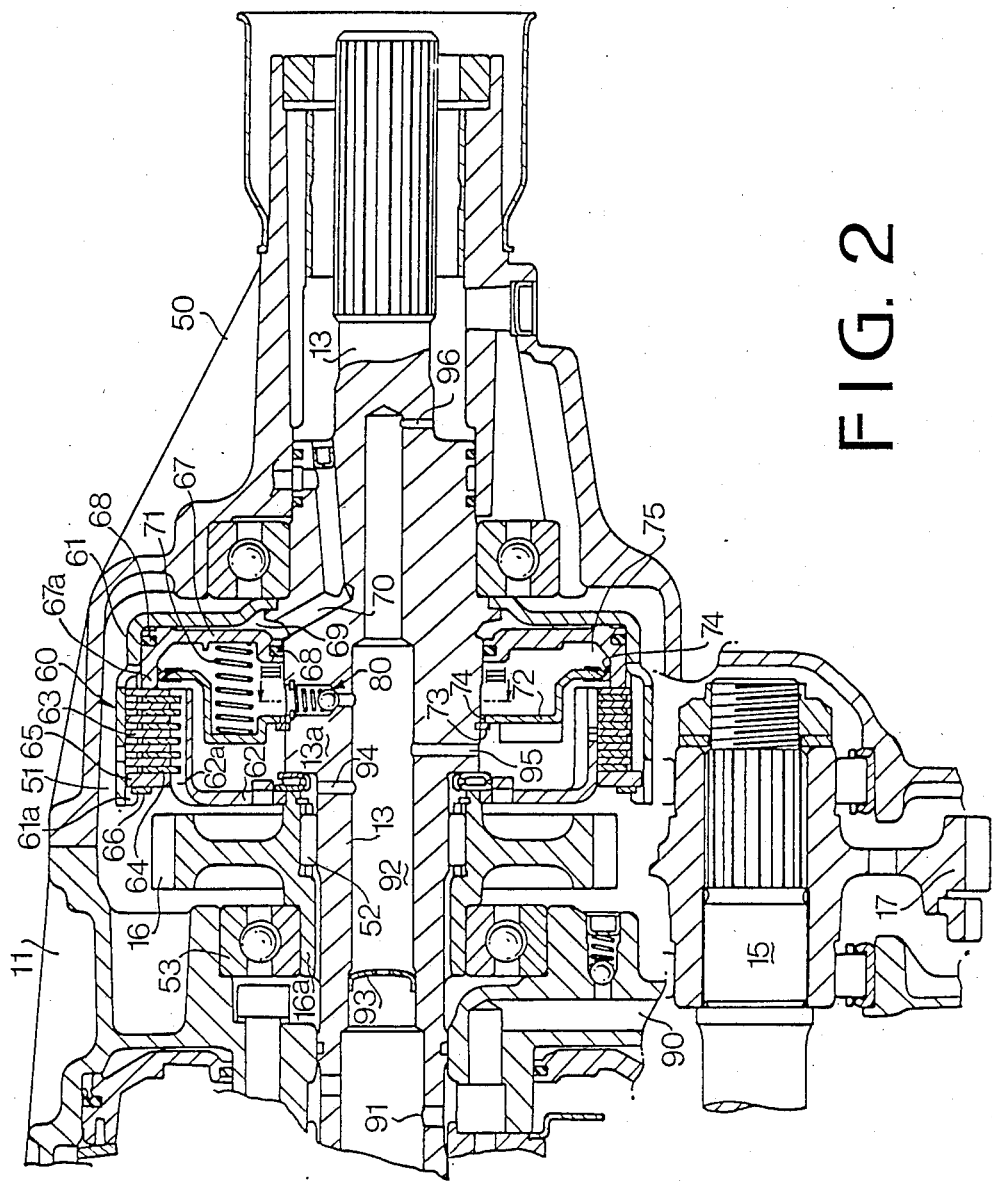
FIG. 2 is an enlarged sectional view showing a part of the system of FIG. 1.

Referring to FIG. 2, a transfer device 51 is provided on the output shaft 13. The transfer device 51 comprises the reduction drive gear 16 mounted on the output shaft 13 through a needle bearing 52, and a transfer clutch 60 disposed between the drive gear 16 and a boss 13a of the output shaft 13. A boss 16a of the drive gear 16 is supported in the transmission case 11 through a bearing 53.

The transfer clutch 60 in the form of a fluid operated multiple-disk friction clutch is provided in the extension case 50. The transfer clutch 60 comprises a drive drum 61 secured to the boss 13a of the output shaft 13 as a drive member, a driven drum 62 secured to the reduction drive gear 16 as a driven member, a plurality of disks 63 splined on the drum 61 through splines 61a, and a plurality of disks 64 splined on the drum 62 through splines 62a, alternately arranged. A plate 65 is secured to the disk 64 by a snap ring 66. A piston 67 is provided in the drum 61 and slidably mounted on the boss 13a of shaft 13. The piston 67 is slidably engaged with an inner periphery of the drum 61 at an outer flange 67a having an oil seal 68. An end of the outer flange 67a is adapted to engage with the innermost disk 63. An oil chamber 69 is formed between the piston 67 and the drum 61. Oil in an oil pressure control unit (not shown) is supplied to or drained from the chamber 69 through an oil passage 70 formed in the shaft 13.

A cylindrical retainer 72 is disposed in a space between the drive drum 61 and the driven drum 62. The retainer 72 has seal rings 74 integrally formed at an inner periphery and at an outer periphery, respectively. The retainer 72 is mounted on the boss 13a of the output shaft 13 by a snap ring 73 and slidably engaged with an inner periphery of the flange 67a of the piston 67. Thus, the retainer 75 is watertightly mounted between the output shaft 13 and the piston 67, thereby defining a centrifugal oil pressure chamber 75 having a large volume, opposite to the oil chamber 69. A return coil spring 71 is provided in the chamber 75 between the piston 67 and the retainer 72.

A check valve 80 is provided in the boss 13a, for communicating the chamber 75 with an oil passage 92 formed in the shaft 13.

Figure 3A:
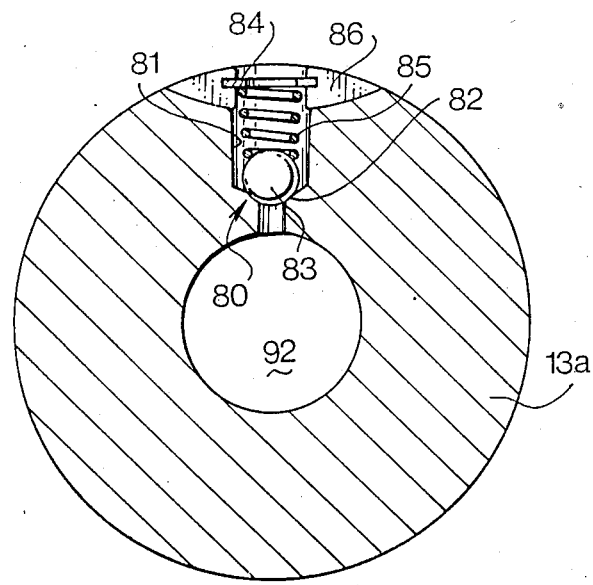
FIG. 3a is a sectional view of a check valve taken along a line III—III of FIG. 2.
Figure 3B:
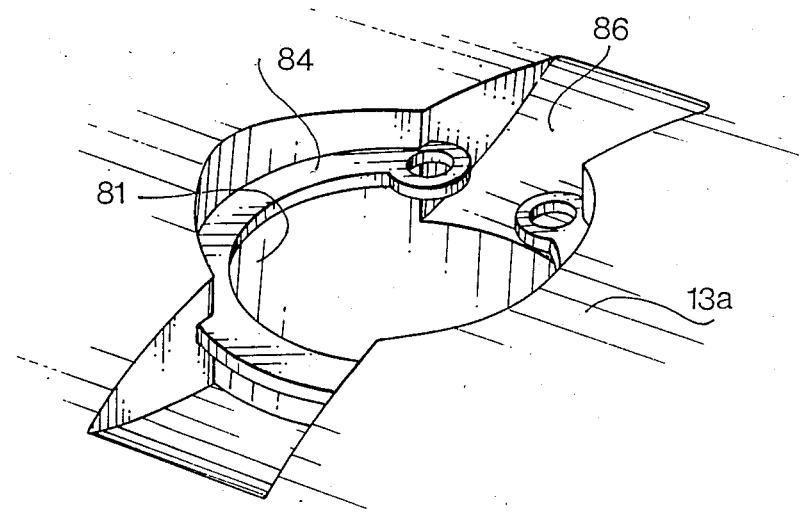
FIG. 3b is perspective view showing a part of the check valve.

Referring to FIGS. 3a and 3b, the check valve 80 is provided in a cylindrical hole 81. The valve has a valve seat 82, and a ball 83 to be engaged with the valve seat 82. A snap ring 84 is secured to an inner periphery of the hole 81 and a coil spring 85 is disposed between the snap ring 84 and the ball 83 to urge the ball to the valve seat 82. Thus, the oil supplied to the chamber 75 is stored in the chamber.

As shown in FIG. 3b, a pair of slant grooves 86 are formed in the boss 13a at circumferentially opposite sides of the hole 81, extending from undersides of the snap ring 84. When the spring 85 is completely contracted in accordance with the pressure of oil exerted on the ball 83, the oil is applied to the chamber 75 through grooves 86.

Describing an oil supply system for the centrifugal oil pressure chamber 75, the lubricating oil cooled in an oil cooler (not shown) is fed to the oil passage 92 through a passage 90 formed in the transmission case 11 and a port 91 formed in the shaft 13. The oil in the passage 92 is fed to a front portion of the transmission, for lubricating each of the parts in the transmission 12 and to the rear portion through an orifice 93 and ports 94 and 95, for lubricating the transfer device, and drained from a port 96. Although the pressure of oil is reduced while flowing, the oil in the passage 92 has a pressure higher than the spring of the check valve 80 so that the oil can be supplied to the chamber 75.

Describing the operation, the engine power is transmitted to the transmission 12 through the input shaft 28 either through the torque converter 4 or through the lockup clutch 3 by controlling the supply of oil to the torque converter. The engine power is transmitted to the output shaft 13 through the transmission and to the rear drive wheels through the propeller shaft.

The oil pressure in the piston chamber 69 of the transfer clutch 60 is increased when the vehicle starts at full depression of an accelerator pedal, uphill climbing or drives on a rough road. The oil pressure is controlled to be low corresponding to a steering angle when the vehicle makes a turn.

When oil is supplied to the chamber 69, the piston 67 is pushed by the pressure of the oil. The outer flange 67a of the piston pushes the disks 63 and 64 to engage the transfer clutch 60, for producing a clutch torque corresponding to the clutch pressure. Thus, the power of the engine from the output shaft 13 corresponding to the clutch torque is transmitted to the front wheels through the clutch 60, reduction drive gear 16, reduction driven gear 17, front drive shaft 15, and front differential 6, so that a full-time wheel driving system is established.

In the system, the lubricating oil from the oil passage 92 is supplied to the transmission 12, various bearings and the transfer clutch 60, and further to the centrifugal oil 10 pressure chamber 75 through the check valve 80.

When the centrifugal force of the oil is exerted in chamber 69, the piston 67 urges the end disk 63. However, the centrifugal force of the oil in the chamber 75 is exerted on the piston 67. Thus, the oil pressure exerted on the piston 67 by the centrifugal force in the oil chamber 69 is canceled, thereby ensuring the control of the clutch torque in accordance with the clutch pressure.

On the other hand, when the engine stops, although the lubricating oil is drained, the ball 83 engages with the valve seat 82 to close the valve 80, so that the oil is maintained in the chamber 75.

When the output shaft 13 rotates by towing the vehicle, the centrifugal force of the oil in the chamber 75 is exerted on the piston 67 to release it from the disks 63 and 64. Hence, even if the centrifugal force of the residual oil in the chamber 69 is exerted on the piston 67, the piston is held at the disengaged position.

When the engine is operated, the check valve 80 is opened in response to leakage of the oil from the chamber 75 and the pressure of supplied oil, so that the oil supplies to the chamber 75. When the spring 85 in the valve 80 is contracted at high speed rotation of the clutch, the chamber 75 is communicated with the oil passage 92 through grooves 86 and the hole 81 to be supplied with oil. 10 In accordance with the present invention, since the centrifugal force of oil in the piston chamber does not affect on the clutch engaging pressure of the fluid operated multiple-disk friction clutch, the clutch torque is accurately controlled by the clutch pressure with a quick response.

Accordingly, in the full time four-wheel driving, the distribution of the torque can be continuously controlled in response to driving conditions and road conditions, so that efficiency of the four-wheel driving can be improved.

When the vehicle makes a turn, the clutch torque is controlled with a quick response so that the tight corner braking can be eliminated. Further, the transfer device of the present invention is effectively employed for the motor vehicle having an antilock brake system.

The centrifugal force oil chamber has a simple structure of a large volume, so that the centrifugal force on the piston is effectively canceled.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A transfer device for a four-wheel drive motor vehicle for transmitting output of a transmission and for distributing the output to front wheels and rear wheels through a front power train and a rear power train, comprising;

a fluid operated clutch having a drive drum and a driven drum which are engaged with each other by pressurized oil, the drive drum being secured to the output shaft of the transmission and to one of the front and rear power trains and the driven drum being secured to the other power train, and a piston slidably mounted in a piston chamber and operated by oil supplied to the piston chamber for engaging the drive drum with the driven drum;

a centrifugal force oil chamber formed in the fluid operated clutch opposite to the piston chamber, interposing the piston;

an oil supply passage for supplying oil in the piston chamber and for operating the piston;

a spring provided in the centrifugal force oil chamber for urging the piston in a releasing direction;

a connecting passage connecting the centrifugal force oil chamber with the oil supply passage;

a check valve provided in the connecting passage so as to maintain oil in the centrifugal force oil chamber, whereby centrifugal force of the oil in the oil chamber acts on the piston to release the clutch.

2. The system according to claim 1 wherein the transmission is an automatic transmission.

3. The system according to claim 1 wherein the fluid operated clutch is a fluid operated multiple-disk friction clutch.

* * * * *